United States Patent [19]

Stambaugh

[11] 4,215,665
[45] Aug. 5, 1980

[54] ADJUSTABLE AIR INTAKE ASSEMBLY AND METHOD

[75] Inventor: Gary E. Stambaugh, Aurora, Ill.

[73] Assignee: Caterpillar Tractor Co., Peoria, Ill.

[21] Appl. No.: 886,968

[22] Filed: Mar. 15, 1978

[51] Int. Cl.² .................................... B01D 50/00
[52] U.S. Cl. .................... 123/198 E; 123/195 C; 55/385 B; 55/419
[58] Field of Search ............. 123/198 E, 195 C; 55/DIG. 28, 385 B, 418, 419

[56] References Cited

U.S. PATENT DOCUMENTS

| | | | |
|---|---|---|---|
| 2,571,828 | 10/1951 | Brezek | 55/418 |
| 2,868,322 | 1/1959 | Stauffer | 55/DIG. 28 |
| 3,452,521 | 7/1969 | Renacle | 55/419 |
| 3,612,024 | 10/1971 | Bandimere | 123/198 E |
| 3,673,995 | 7/1972 | Mangin | 123/198 E |
| 3,737,002 | 6/1973 | Yotsumoto | 55/385 B |
| 3,791,112 | 2/1974 | Lidstone | 55/419 |
| 3,972,700 | 8/1976 | Gleockler | 55/385 B |
| 4,080,184 | 3/1978 | Petersen | 55/385 B |
| 4,117,823 | 10/1978 | Fanabashi et al. | 123/198 E |

*Primary Examiner*—Ira S. Lazarus
*Attorney, Agent, or Firm*—Phillips, Moore, Weissenberger, Lempio & Majestic

[57] ABSTRACT

An air intake assembly for a vehicle comprises a first housing rotatably mounted on the vehicle and a stationary second housing mounted within the first housing. A plurality of first inlets are formed through the first housing and are adapted to align with a plurality of second inlets formed through the second housing to normally permit the passage of air therethrough for engine consumption purposes. Upon further relative rotation of the housings, the inlets become misaligned to prevent the passage of air therethrough. In the preferred embodiment, inlets are formed through both side and bottom walls of the housings and disposed thereon whereby upon alignment of the inlets formed through the side walls of the housing to permit the passage of air therethrough the inlets formed through the bottom walls of the housings will be closed and vice versa.

29 Claims, 4 Drawing Figures

ADJUSTABLE AIR INTAKE ASSEMBLY AND METHOD

BACKGROUND OF THE INVENTION

This invention relates to an air intake assembly of the type employed on a vehicle for communicating ambient air to the intake manifold of an engine thereof.

During winter operation of a tree harvester, for example, falling snow or the like will tend to plug the air intake assembly or precleaner mounted thereon to prevent communication of ambient air to the intake manifold of its engine. Such plugging will normally result in poor engine performance and possible engine shutdown should it become too severe. The problem is normally remedied by disassembling the precleaner to remove the accumulated snow or water upon melting of the snow.

SUMMARY OF THE INVENTION

An object of this invention is to overcome the above problem by providing an adjustable air intake assembly and method for selectively and expeditiously permitting the passage of ambient air to an engine.

In one aspect of this invention, the air intake assembly comprises a first housing having a cylindrical sidewall and first inlet means formed therein to pass air therethrough, including a first inlet formed through the sidewall. The first housing is mounted for relative rotation with respect to a second housing which has a cylindrical sidewall and second inlet means, including a first inlet, formed therein for also passing air therethrough upon alignment with the first inlet means. Thus, alignment of the first and second inlet means, when the first and second housings are rotated to first relative positions, will permit the passage of air therethrough whereas misalignment of the first and second inlet means when the housings are rotated to second relative positions will prevent the passage of air therethrough.

In another aspect of this invention inlets are formed both through side walls and bottom walls of the housings and disposed thereon whereby alignment of the side wall inlets will simultaneously close off the bottom wall inlets and vice versa. This arrangement facilitates the drawing of air into the air intake assembly either directly from ambient or from internally of an engine enclosure having the assembly mounted thereon.

In still another aspect of this invention, a method is disclosed and claimed for employing the above type of air intake assembly for alternately communicating either ambient air or air from within an engine enclosure to an engine of a vehicle.

BRIEF DESCRIPTION OF THE DRAWINGS

Other objects of this invention will become apparent from the following description and accompanying drawings wherein.

DETAILED DESCRIPTION OF THE PREFERRED EMBODIMENT

Figure 1:
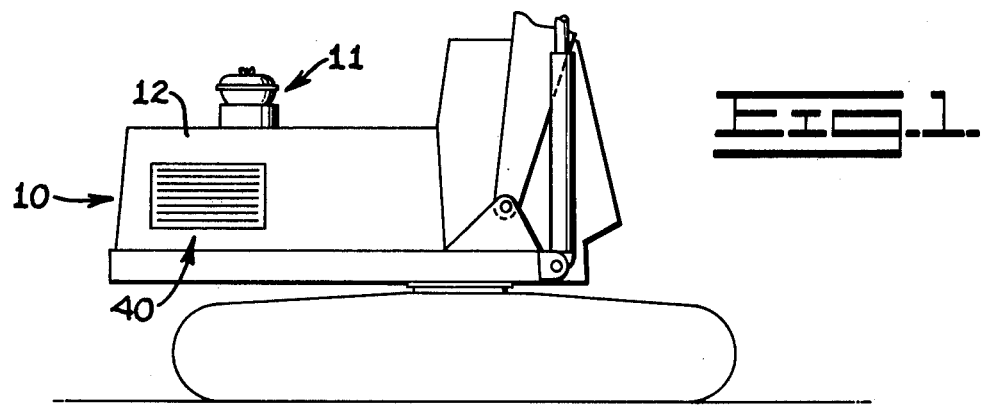
FIG. 1 is a side elevational view of a vehicle having an air intake assembly or precleaner embodying this invention mounted thereon.

FIG. 1 illustrates a vehicle 10, such as a tree harvester, having an air intake assembly or precleaner 11 mounted on an engine enclosure 12 thereof. As more clearly shown in FIG. 2, the precleaner is mounted on an intake conduit 13 for normally communicating ambient air therethrough. The conduit may be suitably connected to a standard air cleaner (not shown) which, in turn, may be connected to an intake manifold of an internal combustion engine to supply fresh air thereto for combustion purposes.

Figure 2:
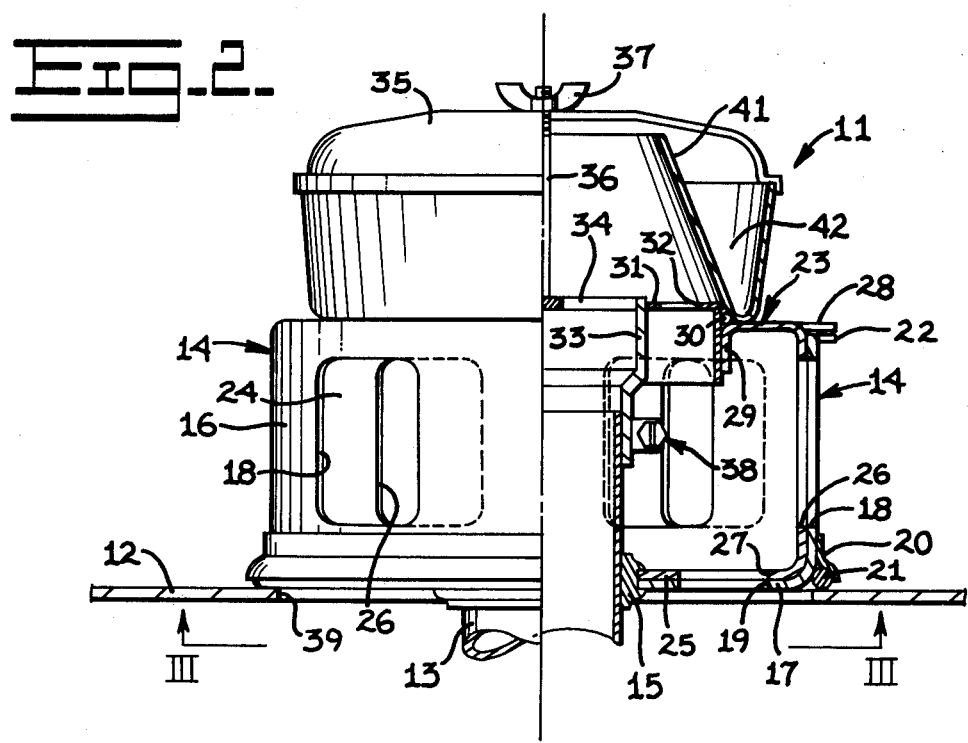
FIG. 2 is an enlarged and partially sectioned side elevational view of the precleaner.
Figure 3:
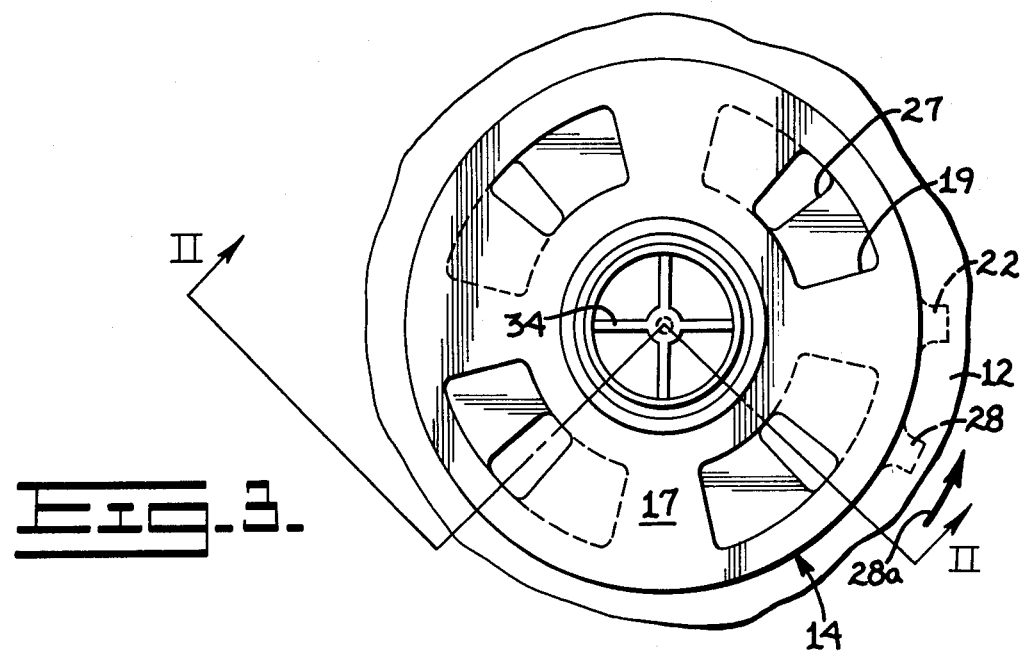
FIG. 3 is a bottom plan view of the precleaner, taken in the direction of arrows III—III in FIG. 2.
Figure 4:
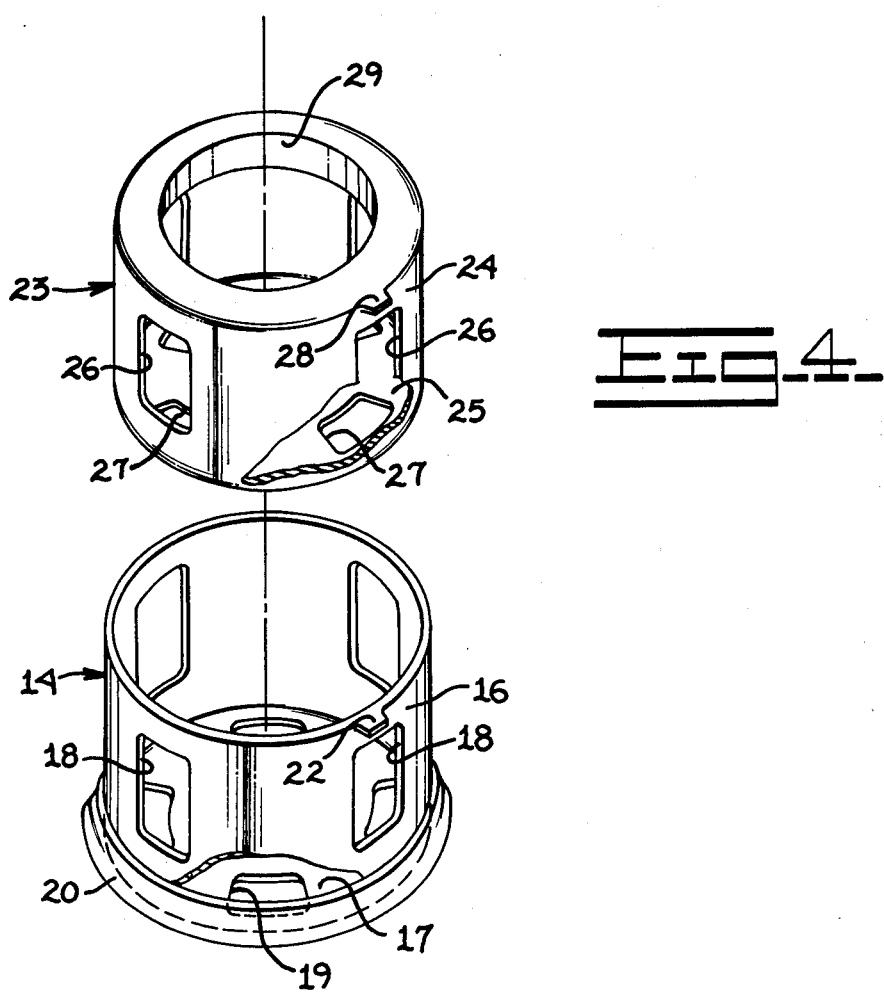
FIG. 4 is an exploded front isometric view of a pair of housings employed in the precleaner.

The precleaner comprises a cup-shaped outer or first housing 14 rotatably mounted on conduit 13 by an annular elastomeric sealing gasket 15. As shown in FIGS. 2-4, the housing comprises a vertically disposed cylindrical side wall 16 and a horizontally disposed bottom wall 17 having first inlet means comprising circumferentially disposed first inlets 18 and second inlets 19 formed therethrough, respectively. Although four such inlets are illustrated as being formed through each of the side and bottom walls of the housing, it should be understood that a lesser or greater number of inlets could be utilized, if so desired.

An annular flange 20 is secured to the lower end of side wall 16 of housing 14 and has an annular sealing means, such as an O-ring seal 21, mounted therein to abut an upper panel of enclosure 12 in sliding and sealing contact therewith. An indexing tab 22 is secured to an upper end of the sidewall for purposes hereinafter explained. A cup-shaped inner or second housing 23 is mounted within first housing 14 and is fixedly secured to conduit 13, as will be hereinafter described.

Referring to FIGS. 2-4, housing 23 comprises side and bottom walls 24 and 25 coextensive with walls 16 and 17, respectively. Bottom wall 25 is superimposed on bottom wall 17 and the inner edge thereof is disposed within gasket 15. Second inlet means comprising circumferentially disposed and arcuate first inlets 26 and second inlets 27 are formed through walls 24 and 25 of housing 23 and are adapted to align with respective inlets 18 and 19, for purposes hereinafter explained.

An indexing tab 28 is secured to an upper end of side wall 24 to cooperate with lug 22 to provide indexing means visually indicating the relative alignment of inlets 18 and 26 as well as the relative alignment of inlets 19 and 27. An annular flange 29 is formed on housing 23 and is disposed radially inwardly from side wall 24 for securance to an annular ring 30. Ring 30 has a circular plate 31 secured thereto, the plate having a plurality of circumferentially disposed holes 32 formed therethrough.

The plate is secured to the periphery of a tubular adapter 33 having a spoke-like member 34 secured thereon (FIG. 3). Housing 23 is thus secured to conduit 13 by means of flange 29, ring 30, plate 31 and adapter 33. A cover 35 is detachably mounted to member 34 by a bolt 36 and a wing nut 37 for selective removal of the cover from the air intake assembly for cleaning purposes. The standard band clamp 38 releasably secures adapter 33 to the upper end of conduit 13 and may be released by insertion of a screwdriver through a pair of aligned inlets 18 and 26.

In operation, during summer months, a tree harvester is not subjected to falling snow, particularly upon shearing of a tree. Thus, indexing lugs 22 and 28 may be aligned to indicate full alignment of inlets 18 and 26 for the passage of ambient air therethrough. Simultaneously therewith, housing 14 will be rotated to a position whereby inlets 19 and 27 are misaligned to prevent the passage of air therethrough from within the engine enclosure and through an enlarged opening 39 formed through the upper panel thereof. Thus, ambient air will communicate to the intake manifold of the engine via inlets 18 and 26, openings 32 and conduit 13. Housing 14 can, of course, be rotated to any desired intermediate position to provide simultaneous partial alignment of the first inlet means (18,19) with the second inlet means (26,27).

During winter months when falling snow gives rise to potential clogging of the precleaner, housing 14 can be rotated relative to housing 24 to reverse the above alignments of the inlets. In particular, inlets 18 will now be misaligned relative to inlets 26 and inlets 19 and 27 will become aligned. Ambient air within the enclosure, entering therein via louvers 40, for example, as shown in FIG. 1, will communicate to conduit 13 via opening 39, inlets 19 and 27 and openings 32.

As shown in FIG. 2, cover 35 preferably comprises a frustoconically shaped partition 41 disposed vertically above conduit 13 and holes 32. The partition thus defines an annular chamber 42 adapted to receive dirt particles or the like therein upon communication of air to the conduit.

It can thus be seen that the air intake assembly of this invention is adapted to be adjusted expeditiously to condition it for the intake of ambient air or air confined within engine enclosure 12. Although particularly adapted for association with a tree harvester, it should be understood that the air intake assembly embodying this invention will prove useful with vehicles having similar problems with respect to adverse ambient conditions. Furthermore, the assembly is compact and is adapted to be assembled and disassembled for servicing purposes expeditiously. It should be further understood that in certain applications, only inlets 18 and 26 need be utilized to communicate ambient air therethrough, i.e., inlets 19 and 27 could be eliminated with bottom walls 17 and 25 of the respective housings being substantially opened to constantly communicate the inside of engine enclosure with conduit 13.

The embodiments of the invention in which an exclusive property or privilege is claimed are defined as follows:

1. An air intake assembly comprising
a first housing,
first inlet means formed in said first housing for passing air therethrough,
a second housing, said first and second housings mounted for relative rotation, and
second inlet means formed in said second housing for passing air therethrough and disposed thereon for (1) alignment with said first inlet means when said first and second housings are rotated to first relative positions to permit the passage of air therethrough and (2) misalignment when said first and second housings are rotated to second relative positions to at least substantially prevent the passage of air therethrough, said first and second housings each comprising a cylindrical side wall and wherein said first inlet means comprises at least one circumferentially disposed first inlet formed through the side wall of said first housing and said second inlet means comprises at least one circumferentially disposed first inlet formed through the side wall of said second housing.

2. The air intake assembly of claim 1 wherein said first housing is stationary and said second housing is rotatably mounted thereon.

3. The air intake assembly of claim 1 wherein said first inlet means comprises a plurality of first inlets disposed in circumferentially spaced relationship on said first housing and said second inlet means comprises a plurality of first inlets circumferentially disposed on the side wall of said second housing.

4. The air intake assembly of claim 1 wherein each of said first and second housings further comprises a bottom wall and wherein said first inlet means further comprises at least one circumferentially disposed second inlet formed through the bottom wall of said first housing and said second inlet means further comprises at least one circumferentially disposed second inlet formed through the bottom wall of said second housing and wherein relative rotation of said first and second housings to place said first inlets in alignment with each other to permit the passage of air therethrough will simultaneously place said second inlets in misalignment to prevent the passage of air therethrough.

5. The air intake assembly of claim 4 wherein said first inlet means comprises a plurality of circumferentially spaced first inlets formed through the side wall of said first housing and a plurality of circumferentially spaced second inlets formed through the bottom wall of said first housing and wherein said second inlet means comprises a plurality of circumferentially spaced second inlets formed through the side wall of said second housing and a plurality of circumferentially spaced second inlets formed through the bottom wall of said second housing.

6. The air intake assembly of claim 1 further comprising indexing means on said first and second housings for visually indicating the relative rotative positions of said first and second housings and relative alignment of said first and second inlet means.

7. The air intake assembly of claim 6 wherein said indexing means comprises a tab secured exteriorly on each of said first and second housings.

8. The air intake assembly of claim 1 further comprising a conduit having said second housing fixedly mounted thereon and wherein said first housing is rotatably mounted on said conduit for rotation relative to said second housing.

9. The air intake assembly of claim 8 further comprising an annular gasket mounted on said conduit, said first and second housings mounted in sealing relationship on said gasket.

10. The air intake assembly of claim 1 further comprising annular sealing means disposed at a lower end of said first housing for engagement with a panel of an engine enclosure and wherein said second housing is disposed within said first housing and said first housing is rotatable relative to said second housing.

11. The air intake assembly of claim 8 further comprising a tubular adapter detachably mounted to an upper end of said conduit and wherein said second housing is secured to said adapter.

12. The air intake assembly of claim 11 wherein said second housing is secured to said adapter by a ring having an annular plate secured thereto, said plate having a plurality of circumferentially disposed holes formed therethrough to communicate said first and second inlet means with said conduit.

13. The air intake assembly of claim 12 further comprising a cover detachably mounted on said adapter.

14. The air intake assembly of claim 13 wherein said cover comprises a frustoconically shaped partition disposed vertically above said conduit and said holes to define an annular chamber adapted to receive dirt particles or the like therein.

15. An air intake assembly mounted on a panel of an engine enclosure, said panel having an opening formed therethrough and said air intake assembly mounted over said opening and comprising a first housing having a cylindrical side wall and a bottom wall, at least one circumferentially disposed first inlet formed through said side wall and at least one circumferentially disposed second inlet formed through said bottom wall, a second housing having a cylindrical side wall and a bottom wall, said first and second housings mounted for relative rotation, a circumferentially disposed first inlet formed through the side wall of said second housing and at least one circumferentially disposed second inlet formed through the bottom wall of said second housing, all of said first and second inlets disposed on said housings for alignment of said first inlets when said first and second housings are rotated to first relative positions to permit the passage of air therethrough and simultaneous misalignment of said second inlets to prevent the passage of air therethrough, said bottom walls disposed over the opening formed through said panel.

16. The air intake assembly of claim 15 wherein said first housing is secured to said panel and said second housing is rotatably mounted thereon.

17. The air intake assembly of claim 15 wherein a plurality of circumferentially spaced first inlets are found through the side wall of said first housing, a plurality of circumferentially spaced second inlets are formed through the bottom wall of said first housing, a plurality of circumferentially spaced second inlets are formed through the side wall of said second housing and a plurality of circumferentially spaced second inlets are formed through the bottom wall of said second housing.

18. The air intake assembly of claim 15 further comprising indexing means on said first and second housings for visually indicating the relative rotative positions of said first and second housings and relative alignment of said inlets.

19. The air intake assembly of claim 18 wherein said indexing means comprises a tab secured exteriorly on each of said first and second housings.

20. The air intake assembly of claim 15 further comprising a conduit having said second housing fixedly mounted thereon and wherein said first housing is rotatably mounted on said conduit for rotation relative to said second housing.

21. The air intake assembly of claim 20 further comprising an annular gasket mounted on said conduit, said first and second housings mounted in sealing relationship on said gasket.

22. The air intake assembly of claim 15 further comprising annular sealing means disposed at a lower end of said first housing for engagement with said panel and wherein said second housing is disposed within said first housing and said first housing is rotatable relative to said second housing.

23. The air intake assembly of claim 20 further comprising a tubular adapter detachably mounted to an upper end of said conduit and wherein said second housing is secured to said adapter.

24. The air intake assembly of claim 23 wherein said second housing is secured to said adapter by a ring having an annular plate secured thereto, said plate having a plurality of circumferentially disposed holes formed therethrough.

25. The air intake assembly of claim 24 further comprising a cover detachably mounted on said adapter.

26. The air intake assembly of claim 25 wherein said cover comprises a frustoconically shaped partition disposed vertically above said conduit and said holes to define an annular chamber adapted to receive dirt particles or the like therein.

27. An air intake assembly comprising
a first housing,
first inlet means formed in said first housing for passing air therethrough,
a second housing, said first and second housings mounted for relative rotation,
second inlet means formed in said second housing for passing air therethrough and disposed thereon for (1) alignment with said first inlet means when said first and second housings are rotated to first relative positions to permit the passage of air therethrough and (2) misalignment when said first and second housings are rotated to second relative positions to at least substantially prevent the passage of air therethrough,
a conduit having said second housing fixedly mounted thereon and wherein said first housing is rotatably mounted on said conduit for rotation relative to said second housing, and
a tubular adapter detachably mounted to an upper end of said conduit and wherein said second housing is secured to said adapter by a ring having an annular plate secured thereto, said plate having a plurality of circumferentially disposed holes formed therethrough to communicate said first and second inlet means with said conduit.

28. A method for adjusting an air intake assembly on an engine enclosure of a vehicle for alternately communicating either ambient air or air from within said enclosure to an engine comprising the steps of
first rotating a housing of said air intake assembly to communicate ambient air directly to said engine while simultaneously blocking communication of air from within said enclosure to said engine, or
second rotating said housing to a different position for blocking communication of ambient air to said engine and for simultaneously communicating air from within said enclosure to said engine.

29. The method of claim 28 wherein said first rotating step comprises rotating said housing relative to another housing to place a first pair of inlets formed through side walls of said housings in alignment and to place a second pair of inlets formed through bottom walls of said housings in nonalignment and wherein said second rotating step comprises placing said first pair of inlets in nonalignment and said second pair of inlets in alignment with respect to each other.

* * * * *